(12) United States Patent
Meir

(10) Patent No.: US 8,984,251 B2
(45) Date of Patent: Mar. 17, 2015

(54) HINTING OF DELETED DATA FROM HOST TO STORAGE DEVICE

(71) Applicant: Apple Inc., Cupertino, CA (US)

(72) Inventor: Avraham Poza Meir, Rishon Le-Zion (IL)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 13/693,196

(22) Filed: Dec. 4, 2012

(65) Prior Publication Data

US 2014/0156967 A1   Jun. 5, 2014

(51) Int. Cl.
| | |
|---|---|
| *G06F 12/00* | (2006.01) |
| *G06F 12/02* | (2006.01) |
| *G06F 12/10* | (2006.01) |
| *G06F 3/06* | (2006.01) |
| *G06F 17/30* | (2006.01) |

(52) U.S. Cl.
CPC ............ *G06F 12/0246* (2013.01); *G06F 12/10* (2013.01); *G06F 3/061* (2013.01); *G06F 3/0649* (2013.01); *G06F 3/0652* (2013.01); *G06F 17/30221* (2013.01); *G06F 3/0679* (2013.01)
USPC ........................................................ 711/173

(58) Field of Classification Search
None
See application file for complete search history.

(56) References Cited

U.S. PATENT DOCUMENTS

| 7,912,877 | B2 | 3/2011 | Shankar et al. | |
|---|---|---|---|---|
| 2005/0097278 | A1* | 5/2005 | Hsu et al. | 711/129 |
| 2006/0010150 | A1 | 1/2006 | Shaath et al. | |
| 2009/0049234 | A1 | 2/2009 | Oh et al. | |
| 2011/0161588 | A1* | 6/2011 | Guthrie et al. | 711/122 |
| 2012/0191900 | A1 | 7/2012 | Kunimatsu et al. | |
| 2012/0203973 | A1* | 8/2012 | Guthrie et al. | 711/133 |
| 2014/0019688 | A1* | 1/2014 | Ghodsnia et al. | 711/135 |

OTHER PUBLICATIONS

International Search Report and Written Opinion from PCT/US2013/068753, mailed Feb. 5, 2014, Apple Inc., pp. 1-11.

* cited by examiner

*Primary Examiner* — Brian Peugh

(74) *Attorney, Agent, or Firm* — Meyertons, Hood, Kivlin, Kowert & Goetzel, P.C.; Erik A. Heter

(57) ABSTRACT

A storage device includes a memory and a processor. The processor is configured to store data items for a host in respective logical addresses, to identify a first subset of the logical addresses as frequently-accessed logical addresses and a second subset of the logical addresses as rarely-accessed logical addresses, to manage the frequently-accessed logical addresses separately from the rarely-accessed logical addresses, to receive from the host an indication of one or more logical addresses, which are used for storing data that is identified by the host as having been deleted by a user, and to add the logical addresses indicated by the host to the rarely-accessed logical addresses.

23 Claims, 1 Drawing Sheet

HINTING OF DELETED DATA FROM HOST TO STORAGE DEVICE

FIELD OF THE INVENTION

The present invention relates generally to memory systems, and particularly to methods for managing data in a storage device.

BACKGROUND OF THE INVENTION

Various techniques are known in the art for storing data in memory according to the usage pattern of the data. For example, U.S. Patent Application Publication 2009/0049234, whose disclosure is incorporated herein by reference, describes a storage scheme that stores data in a solid state memory including first and second memory layers. A first assessment is executed to determine whether received data is hot data or cold data. Received data which is assessed as hot data is stored in the first memory layer, and received data which is assessed as cold data is stored in the second memory layer. Further, a second assessment is executed to determine whether the data stored in the first memory layer is hot data or cold data. Data which is then assessed as cold data during the second assessment is migrated from the first memory layer to the second memory layer.

As another example, U.S. Patent Application Publication 2011/0010489, whose disclosure is incorporated herein by reference, describes a logical block management method for managing a plurality of logical blocks of a Flash memory device. The method includes providing a Flash memory controller, and grouping the logical blocks into a plurality of logical zones, wherein each logical block maps to one of the logical zones. The method also includes counting a use count value for each logical block, and dynamically adjusting mapping relations between the logical blocks and the logical zones according to the use count values. Accordingly, the logical block management method can effectively utilizing the logical zones to determine usage patterns of the logical blocks and use different mechanisms to write data, so as to increase the performance of the Flash memory storage device.

Yet another example of managing hot and cold data is described by Hong and Shin, in "NAND Flash-based Disk Cache Using SLC/MLC Combined Flash Memory," 2010 International Workshop on Storage Network Architecture and Parallel I/Os, May, 2010, which is incorporated herein by reference.

SUMMARY OF THE INVENTION

An embodiment of the present invention described herein provides a storage device including a memory and a processor. The processor is configured to store data items for a host in respective logical addresses, to identify a first subset of the logical addresses as frequently-accessed logical addresses and a second subset of the logical addresses as rarely-accessed logical addresses, to manage the frequently-accessed logical addresses separately from the rarely-accessed logical addresses, to receive from the host an indication of one or more logical addresses, which are used for storing data that is identified by the host as having been deleted by a user, and to add the logical addresses indicated by the host to the rarely-accessed logical addresses.

In some embodiments, the identified data includes a file that is stored in the one or more logical addresses and that has been deleted by the user. In other embodiments, the notification specifies to the processor that the data has been deleted. In yet other embodiments, the notification specifies to the processor that the data is to be processed as rarely-accessed.

In some embodiments, the processor is configured to define in the memory a partition for storing the data that has been identified by the host as having been deleted by the user. In other embodiments, the processor is configured to receive from the host a location of the partition in the memory.

There is additionally provided, in accordance with an embodiment of the present invention, a host including a storage interface and a processor. The storage interface communicates with a storage device. The processor is configured to identify data that is stored on the storage device and has been deleted by a user of the host, and to report to the storage device one or more logical addresses in which the identified data has been stored by the host on the storage device.

There is additionally provided, in accordance with an embodiment of the present invention, a computer including a host and a storage device. The host is configured to identify data that has been deleted by a user and to send a notification that reports one or more logical addresses in which the identified data has been stored by the host on the storage device. The storage device is configured to store data items for the host in respective logical addresses, to identify a first subset of the logical addresses as frequently-accessed logical addresses and a second subset of the logical addresses as rarely-accessed logical addresses, to manage the frequently-accessed logical addresses separately from the rarely-accessed logical addresses, to receive the notification from the host, and to add the one or more logical addresses indicated in the notification to the rarely-accessed logical addresses.

There is additionally provided, in accordance with an embodiment of the present invention, a method including in a storage device, storing data items for a host in respective logical addresses. A first subset of the logical addresses is identified in the storage device as frequently-accessed logical addresses and a second subset of the logical addresses as rarely-accessed logical addresses, and the frequently-accessed logical addresses are managed separately from the rarely-accessed logical addresses. An indication of one or more logical addresses is received in the storage device from the host, which are used for storing data that is identified by the host as having been deleted by a user. The logical addresses indicated by the host are added to the rarely-accessed logical addresses.

There is additionally provided, in accordance with an embodiment of the present invention, a method including storing data items by a host in a storage device. Data that is stored on the storage device and has been deleted by a user of the host is identified in the host. A notification of one or more logical addresses in which the identified data has been stored by the host on the storage device is reported to the storage device.

The present invention will be more fully understood from the following detailed description of the embodiments thereof, taken together with the drawings in which:

DETAILED DESCRIPTION OF EMBODIMENTS

Overview

Some storage devices apply separate processing to frequently-accessed ("hot") and rarely-accessed ("cold") data. This sort of management improves the efficiency and performance of the storage device. In order to apply separate processing successfully, however, the storage device should be able to distinguish between hot and cold data reliably. Embodiments of the present invention that are described herein provide methods and systems that enable storage devices to better distinguish between frequently-accessed and rarely-accessed data.

In some hosts, data that is deleted by a user is retained in the storage device, for example in order to give the user an opportunity to un-delete it. Deleted data may be retained in storage for long periods of time. During this time, it is highly unlikely that the deleted data will be accessed, and this data can therefore be treated as cold. Conventionally, however, the storage device is unaware of the fact that the data is deleted, and cannot make use of this information.

In the disclosed embodiments, when a user deleted certain data in the host, the host sends to the storage device a notification that identifies this data. The storage device classifies the data indicated in the notification as cold, and processes it accordingly. The notification typically indicates the logical addresses of the data that has been deleted in the host. In some embodiments, the notification indicates explicitly that the logical addresses belong to deleted data. In other embodiments, the notification indicates that the logical addresses are to be processed as cold, without giving a reason.

When using the disclosed techniques, the storage device is able to better distinguish between frequently-accessed and rarely-accessed data. Consequently, performance measures such as throughput, latency and reliability can be improved, and the operational lifetime of the storage device can be extended.

System Description

Figure 1:
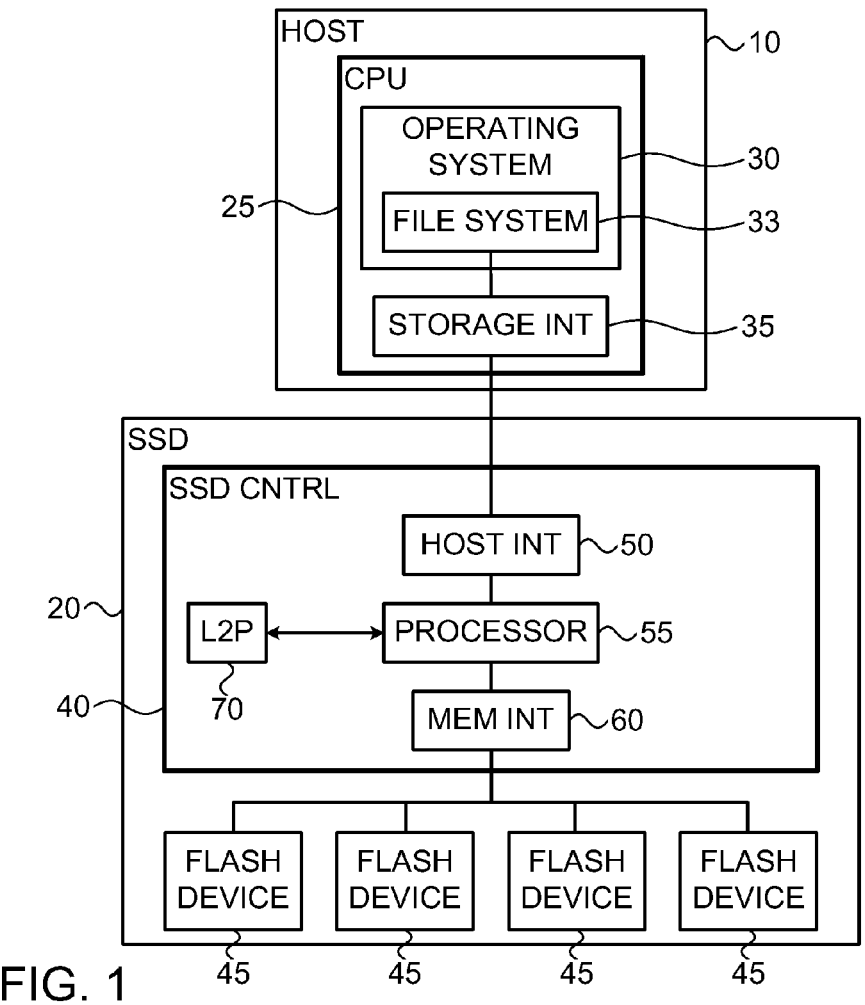
FIG. 1 is a block diagram that schematically illustrates a host device storing data in a storage device, in accordance with an embodiment of the present invention.

FIG. 1 is a block diagram that schematically illustrates a host device 10 storing data in a storage device 20, in accordance with an embodiment of the present invention. Hosts that store data on storage devices with non-volatile storage devices may comprise, for example, personal computers, enterprise storage controllers, mobile phones, digital cameras, media players, removable memory cards or devices, and many others.

Host device 10 comprises a central processing unit (CPU) 25. CPU 25 runs an operating system (OS) 30 that is typically programmed in software, and carries out the functions of the host. Operating system 30 comprises a file system 33, which stores information about the files whose data is stored in storage device 20. In particular, file system 33 records the logical addresses (e.g., Logical Block Addresses—LBAs) in which each file is stored on storage device 20. The file system communicates with storage device 20 via a storage interface 35.

In the example embodiments described herein, storage device 20 comprises a solid state drive (SSD). SSD 20 comprises an SSD controller (SSD CNTRL) 40 that relays data between the host and one or more Flash memory devices 45, and performs the various storage management functions of the SSD. Controller 40 comprises a host interface 50 for communicating with host 10, a processor 55 that carries out the disclosed management techniques, and a memory interface 60 for communicating with Flash devices 45.

SSD 20 manages a Logical-to-Physical (L2P) address mapping 70, which maps the LBAs to respective physical addresses, i.e., physical storage locations in the memory cell blocks of Flash devices 45 where the data is stored.

SSD 20 stores data for host 10 in a non-volatile memory, in the present example in one or more NAND Flash memory devices 45. In alternative embodiments, the non-volatile memory in SSD 20 may comprise any other suitable type of non-volatile memory, such as, for example, NOR Flash, Charge Trap Flash (CTF), Phase Change RAM (PRAM), Magneto-resistive RAM (MRAM) or Ferroelectric RAM (FeRAM).

The configuration of FIG. 1 is an exemplary configuration, which is shown purely for the sake of conceptual clarity, and not by way of limitation of the embodiments of the present invention. Any other suitable host and/or storage device configuration can also be used. In the exemplary system configuration shown in FIG. 1, memory devices 45 and SSD controller 40 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of memory devices 45 are disposed. Further alternatively, some or all of the functionality of SSD controller 40 can be implemented in software and carried out by CPU 25 or other processor in the host. In some embodiments, CPU 25 and SSD controller 40 may be fabricated on the same die, or on separate dies in the same device package.

Processor 55 of SSD controller 40 and/or CPU 25 may be implemented in hardware. Alternatively, the SSD controller and/or CPU may comprise a microprocessor that runs suitable software, or a combination of hardware and software elements. In some embodiments, processor 55 and/or CPU 25 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Improved SSD Performance by Separating Hot and Cold Data

Typically, host 10 sends each data item (e.g., file) for storage in SSD 20 along with one or more LBAs in which the data is to be stored. In practice, some of the LBAs correspond to frequently-assessed data, while other LBAs correspond to rarely-assessed data. Frequently-assessed data is commonly referred to as hot or dynamic data, and rarely-assessed data is commonly referred to as cold or static data. Thus, LBAs corresponding to frequently-assessed data are referred to herein as hot or dynamic LBAs, and LBAs corresponding to rarely-accessed data are referred to herein as cold or static LBAs.

In some embodiments, processor 55 in SSD controller 40 may be configured to process the hot and cold LBAs separately. This sort of processing significantly improves the performance of the SSD. For example, in Flash memory data cannot be overwritten in-place. Moreover, data is typically written in page units, but erased only in block units. For these reasons, the memory blocks in Flash devices 45 gradually accumulate regions of invalid data, for which up-to-date versions have been written into new physical storage locations. Processor 55 typically runs a block compaction ("garbage collection") process, which copies the valid data from fragmented blocks into new blocks and frees the fragmented blocks for erasure and new programming.

When hot and cold data are stored in an inter-mixed fashion in the same memory blocks, the garbage collection process has to copy rarely-accessed data frequently, only because it is intermixed with hot data. The result is a large number of unnecessary copy operations, and thus degraded performance. If, on the other hand, If, on the other hand, the SSD separates the hot and cold data, garbage collection can be performed with high efficiency. Thus, in some embodiments processor 55 stores hot LBAs in a first subset of the memory blocks and cold LBAs in a second subset of the memory blocks, and performs block compaction separately within each subset of blocks.

As another example, in some embodiments the SSD is configured to operate with multi-level cell (MLC) Flash devices that store multiple bits per memory cell. In a 2 bits/cell device, for example, a least significant bit (LSB) and a most significant bit (MSB) page are stored in respective bits of a group of memory cells. Typically, LSB storage and retrieval are significantly faster than MSB storage and retrieval. Thus, in some embodiments processor 55 stores the hot data on the LSB pages and the cold data on the MSB pages. As a result, the average programming and readout latencies are reduced.

The scenarios above are given purely by way of example, in order to demonstrate the benefits of processing the hot data and the cold data separately from one another. In alternative embodiments, processor 55 may process the hot LBAs and cold LBAs separately in any other suitable way. In order to separate the hot and cold data, however, processor 55 should be able to identify and distinguish between the frequently-accessed and rarely-accessed LBAs. Processor 55 may identify the LBAs of hot and cold data using various techniques, such as by assessing the access frequencies of the various LBAs.

Host Indication of Deleted Files to Storage Device

In a typical host, a user may delete a file that is managed by file system 33. The data of the deleted file should still be retained in the SSD, e.g., to give the user an opportunity to un-delete the file. Nevertheless, it is very unlikely that the data of the deleted file will be accessed again, and this data can therefore be treated as cold or static. The SSD, however, is typically unaware of the file structure, e.g., which LBAs correspond to which files, and has no information as to which files have been deleted.

In some embodiments, when a certain file in file system 33 is deleted by the user, CPU 25 sends a notification to SSD controller 40, which indicates to the SSD that the LBAs of that file should be regarded and processed as cold. Upon receiving the notification, processor 55 classifies the reported LBAs as cold and processes them accordingly. In many cases, these LBAs would not be otherwise be identified as cold by the SSD, or they may be identified as cold much later. In either case, the host notification (also referred to as "hint") enables considerable performance improvement in the SSD.

Once the LBAs of the deleted file are classified in the SSD as cold, processor 55 may process them separately from the hot LBAs in any suitable way, such as using the techniques described above.

The host may indicate the LBAs of the deleted file to the SSD in any suitable way and using any suitable interface. In some embodiments, the notification indicates that the LBAs belong to a deleted file. In other embodiments, the notification indicates that the LBAs are to be processed as cold, without specifying a reason.

Figure 2:
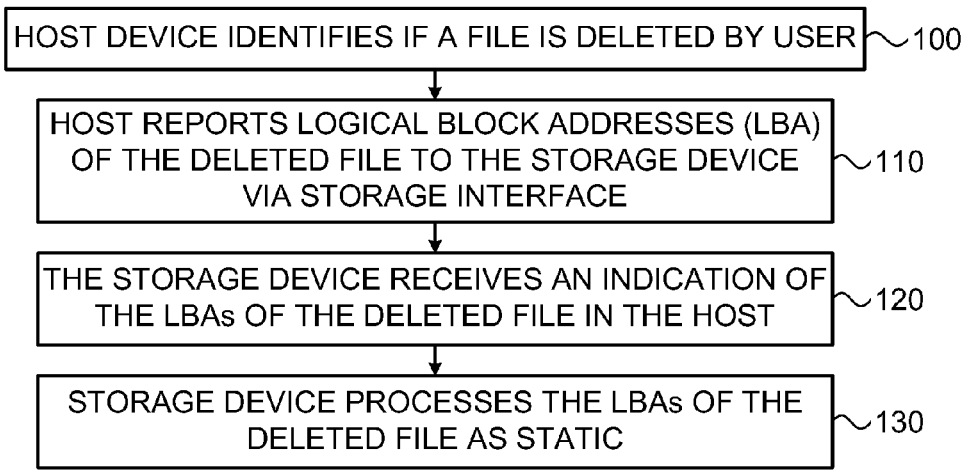
FIG. 2 is a flow chart that schematically illustrates a method for managing data in a storage device after deletion by a host device, in accordance with an embodiment of the present invention.

FIG. 2 is a flow chart that schematically illustrates a method for managing data files in a storage device after deletion by a host device, in accordance with an embodiment of the present invention. In an identifying step 100, host device 10 identifies that a certain file has been deleted by the user. In a reporting step 110, the host reports the logical block addresses (LBAs) of the deleted file to the storage device via storage interface 35. In a receiving step 120, the storage device receives the indication of the LBAs of the deleted file from the host. In a processing step 130, the storage device processes the LBAs of the deleted files as static.

In an alternative embodiment, SSD 20 comprises a partition in the memory, which is used to archive data that was deleted in the host. In this embodiment, SSD 20 receives an indication from host 10 with the LBA range, or a dedicated name-space of the partition identifying the location in memory of the partition. The partition may be dynamic or static.

Although the embodiments described herein mainly address deleted files, the methods and systems described herein can also be used in other applications that do not necessarily involve files or file systems. In other words, the host may report to the storage device the LBAs of any kind of data that has been deleted. For example, the host may report LBAs of files deleted from a data base, which no longer needs to store old copies of the files on the storage device.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A storage device, comprising:
   a memory; and
   a processor, which is configured to store data items for a host in respective logical addresses, to identify a first subset of the logical addresses as frequently-accessed logical addresses and a second subset of the logical addresses as rarely-accessed logical addresses, to manage the first subset of frequently-accessed logical addresses separately from the second subset of rarely-accessed logical addresses, to receive from the host an indication of one or more logical addresses, which are used for storing data that is identified by the host as having been deleted by a user, and to add the logical addresses indicated by the host to the second subset of rarely-accessed logical addresses.

2. The storage device according to claim 1, wherein the identified data comprises a file that is stored in the one or more logical addresses and that has been deleted by the user.

3. The storage device according to claim 1, wherein the notification specifies to the processor that the data has been deleted.

4. The storage device according to claim 1, wherein the notification specifies to the processor that the data is to be processed as rarely-accessed.

5. The storage device according to claim 1, wherein the processor is configured to define in the memory a partition for storing the data that has been identified by the host as having been deleted.

6. The storage device according to claim 5, wherein the processor is configured to receive from the host a location of the partition in the memory.

7. A host, comprising:
a storage interface for communicating with a storage device; and
a processor, which is configured to identify data that is stored on the storage device and has been deleted by a user of the host, and to provide a notification to the storage device of one or more logical addresses in which the identified data has been stored by the host on the storage device, wherein the processor is further configured to store data items for the host in respective logical addresses and to identify a first subset of the logical addresses as frequently-accessed logical addresses and a second subset of the logical addresses as rarely-accessed logical addresses, and wherein the processor is further configured to add the one or more logical addresses indicated in the notification to the second subset of rarely-accessed logical addresses.

8. The host according to claim 7, wherein the identified data comprises a file that is stored in the one or more logical addresses and that has been deleted by the user.

9. The host according to claim 7, wherein the notification specifies to the storage device that the data has been deleted.

10. The host according to claim 7, wherein the notification specifies to the storage device that the data is to be processed as rarely-accessed.

11. A computer, comprising:
a host, which is configured to identify data that has been deleted by a user and to send a notification that reports one or more logical addresses in which the identified data has been stored by the host on the storage device; and
a storage device, which is configured to store data items for the host in respective logical addresses, to identify a first subset of the logical addresses as frequently-accessed logical addresses and a second subset of the logical addresses as rarely-accessed logical addresses, to manage the first subset of frequently-accessed logical addresses separately from the second subset of rarely-accessed logical addresses, to receive the notification from the host, and to add the one or more logical addresses indicated in the notification to the second subset of rarely-accessed logical addresses.

12. A method, comprising:
in a storage device, storing data items for a host in respective logical addresses;
identifying in the storage device a first subset of the logical addresses as frequently-accessed logical addresses and a second subset of the logical addresses as rarely-accessed logical addresses, and managing the first subset of frequently-accessed logical addresses separately from the second subset of rarely-accessed logical addresses;
receiving in the storage device from the host an indication of one or more logical addresses, which are used for storing data that is identified by the host as having been deleted by a user; and
adding the logical addresses indicated by the host to the second subset of rarely-accessed logical addresses.

13. The method according to claim 12, wherein the identified data comprises a file that is stored in the one or more logical addresses and that has been deleted by the user.

14. The method according to claim 12, wherein the notification specifies to the storage device that the data has been deleted.

15. The method according to claim 12, wherein the notification specifies to the storage device that the data is to be processed as rarely-accessed.

16. The method according to claim 12, wherein storing the data items comprises defining in the memory a partition for storing the data that has been identified by the host as having been deleted.

17. The method according to claim 16, and comprising receiving from the host a location of the partition in the storage device.

18. A method, comprising:
storing data items by a host in a storage device;
identifying in the host data that is stored on the storage device and has been deleted by a user of the host;
identifying in the storage device a first subset of the logical addresses as frequently-accessed logical addresses and a second subset of the logical addresses as rarely-accessed logical addresses;
reporting to the storage device a notification of one or more logical addresses in which the identified data has been stored by the host on the storage device; and
adding the logical addresses indicated by the host to the second subset of rarely-accessed logical addresses.

19. The method according to claim 18, wherein the identified data comprises a file that is stored in the one or more logical addresses and that has been deleted by the user.

20. The method according to claim 18, wherein the notification specifies to the storage device that the data has been deleted.

21. The method according to claim 18, wherein the notification specifies to the storage device that the data is to be processed as rarely-accessed.

22. The method according to claim 18, wherein storing the data items comprises defining in the storage device a partition for storing the data that has been identified by the host as having been deleted.

23. The method according to claim 22, wherein reporting the notification comprises reporting a location of the partition in the storage device.

* * * * *